F. J. KREMENTZ.
PIVOTED BRIDGE SPRING FOR EYEGLASSES.
APPLICATION FILED APR. 15, 1916.
1,214,184. Patented Jan. 30, 1917.
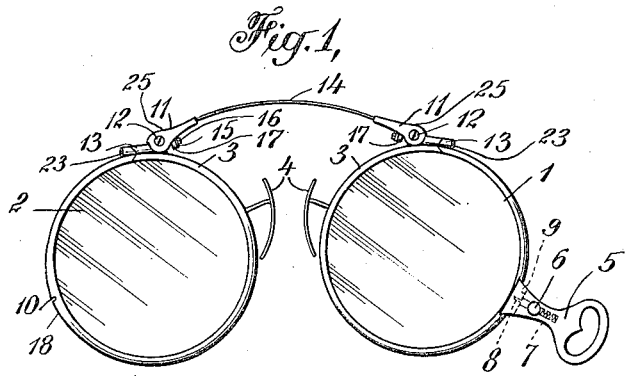
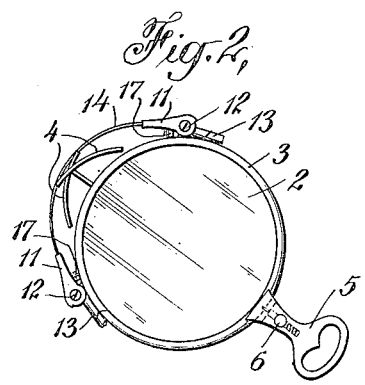
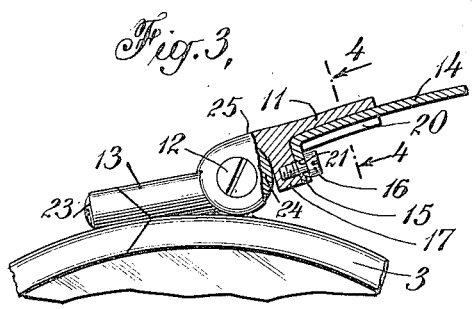 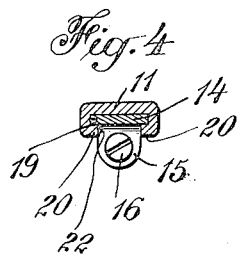
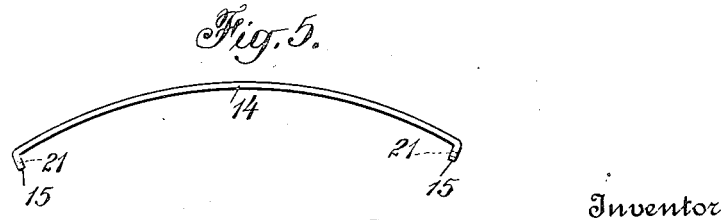
Inventor
Frank J Krementz
By his Attorney
Harry L Duncan

UNITED STATES PATENT OFFICE.

FRANK J. KREMENTZ, OF NEWARK, NEW JERSEY, ASSIGNOR TO FRANK KREMENTZ COMPANY, OF NEWARK, NEW JERSEY, A CORPORATION OF NEW JERSEY.

PIVOTED BRIDGE-SPRING FOR EYEGLASSES.

1,214,184.

Specification of Letters Patent.   Patented Jan. 30, 1917.

Application filed April 15, 1916.   Serial No. 91,287.

*To all whom it may concern:*

Be it known that I, FRANK J. KREMENTZ, a citizen of the United States, and resident of Newark, county of Essex, and State of New Jersey, have made a certain new and useful Invention Relating to Pivoted Bridge-Springs for Eyeglasses, of which the following is a specification, taken in connection with the accompanying drawing, which forms part of the same.

This invention relates especially to pivoted bridge springs which are adapted to be used with folding Oxford or other generally similar eyeglasses. The pivoted bridge spring of such glasses usually comprises spring pivotal connections at each end of the bridge spring of precious metal and by detachably connecting the bridge spring with its pivot connections repairs are greatly facilitated in case of the breakage of the spring. For this purpose the pivot connections may comprise a spring holder formed with a close fitting spring socket so as to accommodate the end of the bridge spring which is secured therein by any suitable holding means, as for instance by a reduced width holding lug on the spring end which may be screwed to a coöperating holding lug on the underside of the connection adjacent the lens frame so that these holding means are practically concealed and may also serve as a spring stop to limit the inward movement of the spring end toward the lens frame and thus minimize excessive strains in the middle of the spring where breakage is most likely to occur.

In the accompanying drawing showing in a somewhat diagrammatic way an illustrative embodiment of this invention, Figure 1 is a front view showing in extended position a folding Oxford eyeglass embodying this invention. Fig. 2 is a corresponding view when the eyeglass is folded. Fig. 3 is an enlarged sectional detail showing the spring pivot connection and holding means for the end of the bridge spring. Fig. 4 is a transverse section thereof taken substantially along the line 4—4 of Fig. 3; and Fig. 5 is a view showing the detachable bridge spring itself when removed from its pivot connections.

In the illustrative embodiment of the invention shown in the drawings the eyeglass which as indicated may be of the folding Oxford type may comprise the lenses 1, 2 mounted within the lens frames 3 which may be formed with the joints 13 so that the joint screw 23 enables each lens frame or eye wire to be properly tightened around its lens. The nose guards 4 may as indicated be mounted on suitable posts secured to the lens frames which are connected by the bridge spring 14 having at each end a spring pivot connection with the lens frame so as to allow the eyeglasses to be folded in the usual way into the position shown in Fig. 2. Under these conditions the notch 10 which may be formed in a suitable enlargement 18 of the lens frame is engaged by the spring catch 8 located within the catch guide 9 formed in the handle 5 so as to accommodate the other lens frame. The eyeglasses are thus retained in folded position until the catch button 6 is retracted against the action of its spring 7 so as to withdraw the spring catch 8 from engagement with the notch 10 in the other lens frame which allows the eyeglasses to automatically snap open under the action of the bridge spring and the pivot springs at each end thereof as is well known in this connection.

As illustrated in greater detail in Fig. 3 the spring pivot connections at each end of the bridge spring may comprise a pivot casing 25 which may substantially inclose the pivot knuckle 24 formed on the lens frame 3. The pivot 12 which may be in the form of a rivet or screw preferably having its threaded end riveted over more or less may pivotally connect these parts in connection with the interposed pivot spring which normally tends as is well understood to force the pivot casing and connected bridge spring into the position shown in Figs. 1 and 3. The spring pivot connections may comprise an extension or bridge spring holder 11 integral with or secured to the pivot casing 25 and preferably formed with a close fitting spring socket 19 of such size as to closely engage the end of the precious metal or other bridge spring 14. By forming a slot 22 in the inner side of this holder adjacent the lens frame as indicated in Figs. 3 and 4 the removable bridge spring may have an offset or bent securing or holding lug 15 preferably of reduced width so that the holding flanges 20 may more securely grip the end of the bridge spring adjacent its edges and insure more exact alinement of these parts. The holding lug may be formed with an aperture and be held in position as by the holding screw 21 passing through this aperture and into a correspondingly located threaded hole in the holding lug 17 on the pivot casing, the location of the holding devices employed being preferably such that they act as a spring stop to limit the inward pivotal movement of the end of the bridge spring and its connections when the glasses are folded. It is thus apparent that the bridge spring is securely held at its ends in these spring pivot connections and that in case of breakage of such bridge springs which sometimes occurs especially when they are made of precious metal a broken spring may be readily removed from its pivot connections after taking out the holding screws or releasing the other holding means employed, and replaced by a new bridge spring; and this work can be done by the ordinary optician without impairing the high finish of these folding Oxford eyeglasses even when they are made of precious metal. This construction also facilitates the replacement of one bridge spring with another of slightly different length or stiffness which is sometimes desirable in fitting these eyeglasses, it being understood that the bridge springs in such form as indicated in Fig. 5 may be supplied to opticians in various lengths and strengths or stiffnesses to suit the requirements of different wearers of the glasses.

This invention has been described in connection with a number of illustrative embodiments, forms, proportions, parts, materials and arrangements, to the details of which disclosure the invention is not of course to be limited, since what is claimed as new and what is desired to be secured by Letters Patent is set forth in the appended claims.

I claim—

1. The folding Oxford eyeglasses comprising lens frames having nose guards mounted thereon, a handle having a spring catch device and mounted on said lens frames to releasably hold them in folded position, a pivoted bridge connecting said lens frames and comprising a precious metal bridge spring, a spring pivot connection detachably secured at each end of said bridge spring and comprising a pivot casing to have spring pivotal connection with the coöperating lens frame, a spring holder connected to said pivot casing and provided with a close fitting spring socket to accommodate the end of said bridge spring and provided with a slot on the inner side of said holder adjacent the lens frame, a reduced width securing lug on said bridge spring to be accommodated by said slot, a coöperating holding lug on said holder and a holding screw connecting said lugs to hold the end of said bridge spring in operative engagement with said pivotal connection, said holding means acting as a stop to limit the inward movement of the ends of said bridge spring toward said lens frames.

2. The folding eyeglasses comprising lens frames having nose guards mounted thereon, a pivoted bridge connecting said lens frames and comprising a precious metal bridge spring, a spring pivot connection detachably secured at each end of said bridge spring and comprising a spring holder provided with a close fitting spring socket to accommodate the end of said bridge spring and provided with a slot on the inner side of said holder adjacent the lens frame, a reduced width securing lug on said bridge spring to be accommodated by said slot, a coöperating holding lug on said holder and a holding screw connecting said lugs to hold the end of said bridge spring in operative engagement with said pivotal connection, said holding means acting as a stop to limit the inward movement of the ends of said bridge spring toward said lens frames.

3. The folding eyeglasses comprising lens frames having nose guards mounted thereon, a pivoted bridge connecting said lens frames and comprising a bridge spring, a spring pivot connection detachably secured at each end of said bridge spring and comprising a spring holder provided with a close fitting spring socket to accommodate the end of said bridge spring and provided with a slot on the inner side of said holder adjacent the lens frame, and holding means comprising a reduced width securing member on said bridge spring to be accommodated by said slot, said holding means acting as a stop to limit the inward movement of the ends of said bridge spring toward said lens frames.

4. The pivoted bridge adapted to connect the lens frames of a folding Oxford or generally similar eyeglass and comprising a precious metal bridge spring, a spring pivot connection detachably secured at each end of said bridge spring and comprising a pivot casing to have spring pivotal connection with the coöperating lens frame, a spring holder connected to said pivot casing and provided with a close fitting spring socket to accommodate the end of said bridge spring and provided with a slot on the inner side of said holder adjacent the lens frame, a reduced width securing lug on said bridge spring to be accommodated by said slot, a coöperating holding lug on said holder and a holding screw connecting said lugs to hold the end of said bridge spring in operative engagement with said pivotal connection, said holding means being adapted to act as a stop to limit the inward movement of the ends of said bridge spring toward the lens frames.

5. The pivoted bridge adapted to connect the lens frames of a folding Oxford or generally similar eyeglass and comprising a precious metal bridge spring, a spring pivot connection detachably secured at each end of said bridge spring and comprising a spring holder provided with a close fitting spring socket to accommodate the end of said bridge spring and provided with a slot on the inner side of said holder adjacent the lens frame, a reduced width securing lug on said bridge spring to be accommodated by said slot, a coöperating holding lug on said holder and a holding screw connecting said lugs to hold the end of said bridge spring in operative engagement with said pivotal connection.

6. The pivoted bridge adapted to connect the lens frames of a folding Oxford or other eyeglass and comprising a precious metal bridge spring, a spring pivot connection detachably secured at each end of said bridge spring and comprising a spring holder provided with a close fitting spring socket to accommodate the end of said bridge spring and coöperating screw holding means located on the inner side of said holder adjacent the lens frame, said holding means being adapted to act as a stop to limit the inward movement of the ends of said bridge spring toward the lens frames.

FRANK J. KREMENTZ.

Witnesses:
 Chas. D. Sims,
 Harry Higham.